United States Patent
Longoria et al.

(10) Patent No.: US 6,168,370 B1
(45) Date of Patent: Jan. 2, 2001

(54) VACUUM MODULE FOR TORTILLA COUNTER-STACKER

(75) Inventors: Jose L. Longoria; Steven M. Kenison, both of Plainview, TX (US)

(73) Assignee: ITE, Inc., Plainview, TX (US)

( * ) Notice: Under 35 U.S.C. 154(b), the term of this patent shall be extended for 0 days.

(21) Appl. No.: 09/251,770

(22) Filed: Feb. 17, 1999

Related U.S. Application Data (63) Continuation-in-part of application No. 09/072,563, filed on May 5, 1998.
(60) Provisional application No. 60/067,127, filed on Dec. 2, 1997.

(51) Int. Cl.[7] .......................... B65H 29/32; B65G 57/04
(52) U.S. Cl. .................. 414/793.1; 414/793; 414/789.9; 414/901; 271/197; 271/69
(58) Field of Search .................... 414/793, 793.1, 414/788.9, 790.8, 793.4, 901; 271/196, 197, 69, 194, 108; 198/689.1

(56) References Cited

U.S. PATENT DOCUMENTS

| | | | |
|---|---|---|---|
| 3,366,253 | * 1/1968 | Walchhuter | 414/901 |
| 3,395,915 | * 8/1968 | Clausen et al. | 414/793.1 |
| 3,490,764 | * 1/1970 | Muller et al. | 271/197 |
| 3,759,402 | * 9/1973 | Hitch et al. | 414/790.8 |
| 3,842,698 | * 10/1974 | Fitch et al. | 414/790.8 |
| 3,848,757 | * 11/1974 | Jordan | 414/793.1 |
| 4,311,475 | * 1/1982 | Imai | 414/901 |
| 4,405,186 | * 9/1983 | Sandberg et al. | 414/790.8 |
| 4,620,826 | * 11/1986 | Rubio et al. | 414/793.1 |
| 4,831,419 | * 5/1989 | Iaia, Jr. et al. | 271/197 |
| 4,856,262 | * 8/1989 | Uithoven | 414/793.1 |
| 4,934,687 | * 6/1990 | Hayden et al. | 414/789.9 |
| 5,201,513 | * 4/1993 | Mion | 271/197 |
| 5,234,097 | * 8/1993 | Okuyama | 198/689.1 |
| 5,253,762 | 10/1993 | Duncan | 209/552 |
| 5,494,398 | 2/1996 | Montemayor | 414/797 |
| 5,526,105 | * 6/1996 | Kenin et al. | 271/197 |
| 5,531,156 | 7/1996 | Brummett | 99/450 |
| 5,569,016 | * 10/1996 | Mokler | 414/793 |
| 5,601,397 | 2/1997 | Lopez | 414/790.7 |
| 5,720,593 | 2/1998 | Pleake | 414/789.9 |
| 5,833,231 | * 11/1998 | Schreiner | 271/196 |

FOREIGN PATENT DOCUMENTS

| | | | | |
|---|---|---|---|---|
| 1252139 | * 10/1967 | (DE) | | 414/793.1 |
| 0867828 | * 9/1981 | (SU) | | 414/793.1 |

* cited by examiner

Primary Examiner—Douglas Hess
(74) Attorney, Agent, or Firm—Daniel V. Thompson (57) ABSTRACT

A counter-stacker (10) for tortillas includes a housing (12), a perforated belt (16) within the housing (12), the perforated belt (16) adapted and arranged to receive incoming tortillas (42) and form vacuum-lifted tortillas (42A). At least one stacker belt (26) is rotatably mounted within the housing (12). A vacuum housing (28) is sealably mounted to the housing (12), the vacuum housing (28) connected to a means of producing vacuum (30). At least one stacker canister (32) is positioned under a rear end of the perforated belt (16). A bottom perforated plate (36A) has a plurality of bottom perforated plate openings (36AA) therethrough positioned within the perforated belt (16). A top perforated plate (36B) is slidably positioned on top of the bottom perforated plate (36A), the top perforated plate (36B) comprising a plurality of complimentary positioned top perforated plate openings (36BA). At least one actuator (38C) is connected to the top perforated plate (36B), such that when the at least one actuator (38C) shifts position of the top perforated plate (36B) and concurrently the plurality of bottom perforated plate openings (36AA) and the plurality of top perforated plate openings (36BA) are misaligned causing no vacuum ingress in the vacuum housing (28), allowing the vacuum-lifted tortillas (42A) to fall into the at least one stacker canister (32).

14 Claims, 5 Drawing Sheets

VACUUM MODULE FOR TORTILLA COUNTER-STACKER

CROSS REFERENCE TO RELATED APPLICATIONS

This application is a continuation in part of application Ser. No. 09/072,563 filed on May 5, 1998, titled Tortilla Counter-Stacker, which was a continuation of the provisional patent application Ser. No. 60/067,127 filed on Dec. 2, 1997, titled Tortilla Counter-Stacker.

TECHNICAL FIELD

This invention is related to food handling apparatus, and more particularly to an improved device for counting and stacking thin, flexible food items such as tortillas.

BACKGROUND ART

The state of the art in tortilla counter-stackers is the counter-stacker manufactured by Arr-Tech Mfg., Inc. This device suffers from a severe drawback, in that the tortillas stacked by this device are not coaxially aligned, resulting in stacks having ragged edges like a deck of cards immediately after shuffling. Also like a deck of cards, the stacks of tortillas have to be manually tapped on the sides to obtain a smooth-sided cylindrical stack. In an industry where the production of tortillas is almost totally automated, this manual stack-aligning step adds substantial labor cost. It is estimated that for tortillas only 20% of the cost is in the product and 80% is in the labor-intensive packaging process. Automated stack-aligning would eliminate a half to two-thirds of the labor involved in packaging.

Numerous innovations for Tortilla Counter-Stackers have been provided in the prior art that are described as follows. Even though these innovations may be suitable for the specific individual purposes to which they address, they differ from the present invention as hereinafter contrasted.

In U.S. Pat. No. 4,760,777, titled Tortilla Stacker, invented by Richard S. Welsh, an apparatus for stacking tortillas includes a loading unit in the form of a trough-like loading conveyor for transporting a series of dough members while forming a small depression in each of the dough members. A container in the form of an upright hollow cylinder having a retractable loading surface is positioned at the discharge end of the loading conveyor. The tortillas are stacked one-on-top-of-the-other on the retractable loading surface by the loading conveyor. A conveyor located beneath the container receives the stack of tortillas upon retraction of the loading surface. A counter on an inclined chute leading to the conveyor accurately counts the number of tortillas entering the container.

In U.S. Pat. No. 4,006,831, titled Automatic Tortilla Counter and Stacker, invented by James A. Jimenez, a method of stacking articles and an automatically controlled apparatus for successively receiving articles formed of rigid or semirigid sheet material such as cooked or partially cooked tortillas or similar food products, automatically formed orderly stacks of a predetermined number of articles, and then automatically carrying away for packaging each stack when completed.

In U.S. Pat. No. 4,530,632, titled Stacking Apparatus for Flexible, Generally Planar Food Products, invented by Richard Sela, an apparatus for counting and stacking food products such as tortillas. The tortillas are initially placed on an entry chute containing a large number of air outlets for creating a cushion of air to allow the tortilla to slide down the entry chute onto an incline conveyor belt. The conveyor belt is of an open mesh design and it is supported on a belt support having a large number of air inlets which create a vacuum that maintains the tortilla in contact with the belt. The tortillas are carried by the belt down one end of the belt support and along the underside of the belt support with contact between the tortilla and belt being maintained by vacuum creating air inlets formed in the belt support. The air inlets terminate at a location on the underside of the belt support thereby allowing the tortillas to drop from the conveyor belt. The tortillas drop onto a stationary rack formed by rods which are interleaved with conveyor belts moving together as a unit. The conveyor belts are normally positioned beneath the upper surface of the rack. However, when a predetermined number of tortillas have been stacked, the belt is lifted thereby carrying the tortillas from the rack. The mechanism for lifting the belts is actuated by a counter which counts a predetermined number of tortillas passing past a counting station and delays actuating the belt lifting mechanism until the final tortilla has dropped onto the rack. The belts discharging the stacks of tortillas move in the direction opposite the direction that the tortillas are delivered to the rack in order to minimize the time required to remove the tortillas from the rack before an additional tortilla may be placed thereon.

In U.S. Pat. No. 5,720,593, titled Apparatus and Method of Counting, Inspecting and Stacking Planar Food Products, invented by Todd B. Pleake, an apparatus for counting, inspecting, and stacking flexible, generally planar food products such as tortillas, or the like. The apparatus has an inclined infeed conveyor with adjustable alignment guides thereon to adjust the lateral position of each tortilla as it moves to a transit conveyor. Sensors mounted on the transit conveyor count the tortillas and inspect the size and shape of the tortillas to detect any defective tortillas moving along the transit conveyor. At the end of the transit conveyor, an arcuate-shaped trajectory guide bends the tortilla into an arcuate shape as the tortilla leaves the trajectory guide and flies through a known flight trajectory to a stacking mechanism. The arcuate shape allows the leading edge of the tortilla to resist bending or folding. A rejection mechanism positioned between the end of the transit conveyor and the trajectory guide redirects any rejected tortillas detected by the sensors downward away from the trajectory guide. A stacking mechanism receives the tortillas at the end of the flight trajectory. A shaker shakes the stacking mechanism and jostles the stack of tortillas to form a tight, aligned stack. A movable stack plate supports the stack of tortillas in the stacking mechanism and moves downward incrementally as tortillas are stacked into the stacking mechanism so the flight trajectory of each tortilla is approximately the same. The stacking plate has a lowered position that deposits a stack of tortillas on a baseplate, and a stack removal device moves the stack of tortillas away from the stacking assembly to a discharge conveyor.

In U.S. Pat. No. 5,253,762, titled Stacking, Counting and Sorting Device for Flexible, Planar Food Products, invented by Daryl G. Duncan, a device for counting, inspecting, sorting, and stacking planar food products such as tortillas. The tortillas are sandwiched between a pair of conveyor belts moving at the same speed to a discharge location between a pair of rollers around which the respective conveyor belts extend. The speed of the tortillas causes them to be flung from between the rollers onto a discharge tray. A counter determines when a predetermined number of tortillas have been discharged onto the discharge tray. The counter then triggers an actuator to remove the tray from beneath the stack of tortillas, thereby allowing them to fall onto a discharge conveyor belt. The discharge conveyor belt is then moved an incremental distance. The tortillas passing through the device are scanned in order to detect defective tortillas. When a defective tortilla is found, one of the rollers at the discharge location is shifted, thereby altering the path of the tortillas flung from the conveyor belts at the discharge location onto a reject discharge conveyor belt.

In U.S. Pat. No. 5,601,397, titled Apparatus for Counting and Stacking Tortillas, invented by Manuel Lopez and Rafael Lopez, an apparatus having a series of conveyor belts for flattening and stacking a plurality of flexible, generally planar articles, such as tortillas. The apparatus includes a first conveyor belt extending along first end, upper, second end and lower surfaces of a belt support. The conveyor belt is adapted to move the planar articles placed on the upper surface of the belt support from the first end to the second end. A second conveyor belt is biased against the first belt at the second end of the belt support for applying compressive and lateral forces to the planar articles as they are moved along the second end of the belt support. A third conveyor belt is located beneath the first and second conveyor belts for receiving the planar articles from the first belt, forming stacks of them, and then discharging the stacked planar articles. Motor assemblies drive the first, second, and third conveyor belts.

In U.S. Pat. No. 4,054,015, titled Chip Packing Apparatus and Method, invented by Lorne A. Rowell, invented by Lorne A. Rowell, an apparatus for stacking food chips in a cylindrical container. Random chips are oriented into tandem alignment on an inclined conveyor traveling in an upward direction and are deposited into an upright cylindrical stacking tube above a station for the empty cylindrical containers. A valve comprising operatively associated upper and lower blades in the stacking tube load vertical stacks of chips into the cylindrical containers.

In U.S. Pat. No. 3,915,316, titled Counting and Stacking Apparatus, invented by Johnny B. Pomara, Jr., apparatus for counting and stacking substantially flat articles, such, particularly, as food articles of the nature of Mexican tortillas, which includes a first belt type feed conveyor, a second belt type stacking conveyor intermeshing with a vertically movable stacking rack or fork, and a take-away conveyor. The articles are sequentially fed from a conventional conveyor from apparatus such as an oven to the feed conveyor beneath a counting switch. Each article is discharged from the feed conveyor in a stacked relationship to the stacking conveyor against the stacking rack. When the desired number of articles are stacked on the stacking conveyor against the rack, the rack rapidly retracts downwardly releasing the stack for discharge to the take-away conveyor. Between the time of discharge of each stack and the arrival of the first article for forming the next stack, the stacking rack returns upwardly to intermeshed relationship with the stacking conveyor for forming and holding the next stack.

In U.S. Pat. No. , 5,531,156, titled, Automatic Taco Machine, invented by Brummett, an automatic taco machine can automatically make both soft and hard tacos. Storage compartments for soft tortillas and hard taco shells are mounted above a V-shaped conveyor. A soft tortilla is removable from a stack of tortillas by a vacuum pick-up head and is heated and is inserted between a pair of heated plates where it is compressed and heated. A pusher bar moves downwardly through slots in the heater plates to fold the tortilla and push it onto the conveyor. A hot food dispenser and a cold food dispenser dispense hot and cold food onto the tortilla as it is moved by the conveyor. A hard taco shell is removable from a stack of taco shells by a reciprocally mounted peeler which separates the bottom taco shell from the stack and supports the stack while the bottom taco shell drops to the conveyor. The conveyor moves the taco shell past the hot and cold food dispensers.

In U.S. Pat. No. , 5,494,398, titled, Unstacking Machine and Method, invented by Montemayor, et. al., a device as described for unstacking thin, flat articles, particularly flexible articles, and especially tortillas, from a stack of the same, which includes means for repetitively picking up the topmost tortilla in a stack and conveying it to a moving belt where it is deposited individually and separately and moved to a further processing operation. The pick up means includes a rotating cylinder having holes in its surface th rough which suction acts on the tortillas, to temporarily hold them to the cylinder, and belts around and rotating with the cylinder which transfer the tortillas from the cylinder to the moving conveyor.

The above patented inventions differ from the present invention because they fail to describe or claim at least one combination of the following features depicted in the present invention: vacuum housing, vacuum, stacker, bottom perforated plate, top perforated plate, and connector drive.

SUMMARY OF THE INVENTION

This invention provides a vacuum module for a counter-stacker for tortillas where tortillas are evenly stacked and the stacks are transported to a bagging station substantially ready to be bagged. The present invention describes and claims novel elements such as a vacuum housing, vacuum, bottom perforated plate, top perforated plate, and actuator in conjunction with other novel features such as a sequenced elevator, lift, stacker, vibrating canister and conical canister sleeve which are an improvement of the art making the invention more commercially viable.

The types of problems encountered in the prior art are incoming tortillas are hard to automate into a stack.

In the prior art, unsuccessful attempts to solve this problem were attempted namely: manual stackers and cylindrical stackers. However, the problem was solved by the present invention because of the vacuum housing, vacuum, bottom perforated plate, top perforated plate, and actuator.

Innovations within the prior art are rapidly being exploited in the field of automated food preparation.

The present invention went contrary to the teaching of the art which teaches semi-automated tortilla manufacturing.

The present invention solved a long felt need for a fully automated tortilla manufacturing apparatus.

The present invention produced unexpected results namely: the tortillas where less damaged and therefor had a lower return rate.

A synergistic effect was produced utilizing the present invention due to the following facts and results from experimentation: the cost of tortilla manufacturing and the cost of bagging was reduced due to the more evenly stacked tortillas.

Accordingly, it is an object of the present invention to provide a counter-stacker having a housing, front perforated belt tractor, rear perforated belt tractor, perforated belt, drive motor, front feeder belt tractor, rear feeder belt tractor, middle feeder belt tractor, feeder belt, front stacker belt tractor, rear stacker belt tractor, middle stacker belt tractor, stacker belt, vacuum housing, vacuum, stacker, upper optical sensor, lower optical sensor, bottom perforated plate having bottom perforated plate openings, top perforated plate having top perforated plate opening, bottom connector, top connector, actuator, elevator, elevator drive, elevator horizontal member, and elevator vertical member.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

| | |
|---|---|
| 10 | counter-stacker with vacuum module (10) |
| 12 | housing (12) |
| 12F | housing front support (12F) |
| 12R | housing rear support (12R) |
| 14F | front perforated belt tractor (14F) |
| 14R | rear perforated belt tractor (14R) |
| 16 | perforated belt (16) |
| 18 | drive motor (18) |
| 18A | drive motor connector (18A) |
| 18B | drive motor pulley (18B) |
| 20F | front feeder belt tractor (20F) |
| 20R | rear feeder belt tractor (20R) |
| 20M | middle feeder belt tractor (20M) |
| 22 | feeder belt (22) |
| 24F | front stacker belt tractor (24F) |
| 24R | rear stacker belt tractor (24R) |
| 24M | middle stacker belt tractor (24M) |
| 26 | stacker belt (26) |
| 28 | vacuum housing (28) |
| 30 | vacuum blower (30) |
| 32 | stacker canister (32) |
| 32T | stacker top (32T) |
| 32B | stacker bottom (32B) |
| 34A | upper optical sensor (34A) |
| 34AA | upper optical sensor mount (34AA) |
| 34B | lower optical sensor (34B) |
| 34BA | lower optical sensor mount (34BA) |
| 36A | bottom perforated plate (36A) |
| 36AA | bottom perforated plate opening (36AA) |
| 36B | top perforated plate (36B) |
| 36BA | top perforated plate opening (36BA) |
| 38A | bottom connector (38A) |
| 38B | top connector (38B) |
| 38C | actuator (38C) |
| 40 | elevator (40) |
| 42 | tortilla |
| 42A | vacuum-lifted tortilla |
| 42B | tortilla pre-stack |
| 42C | tortilla stack |

DESCRIPTION OF THE PREFERRED EMBODIMENT

Figure 1:
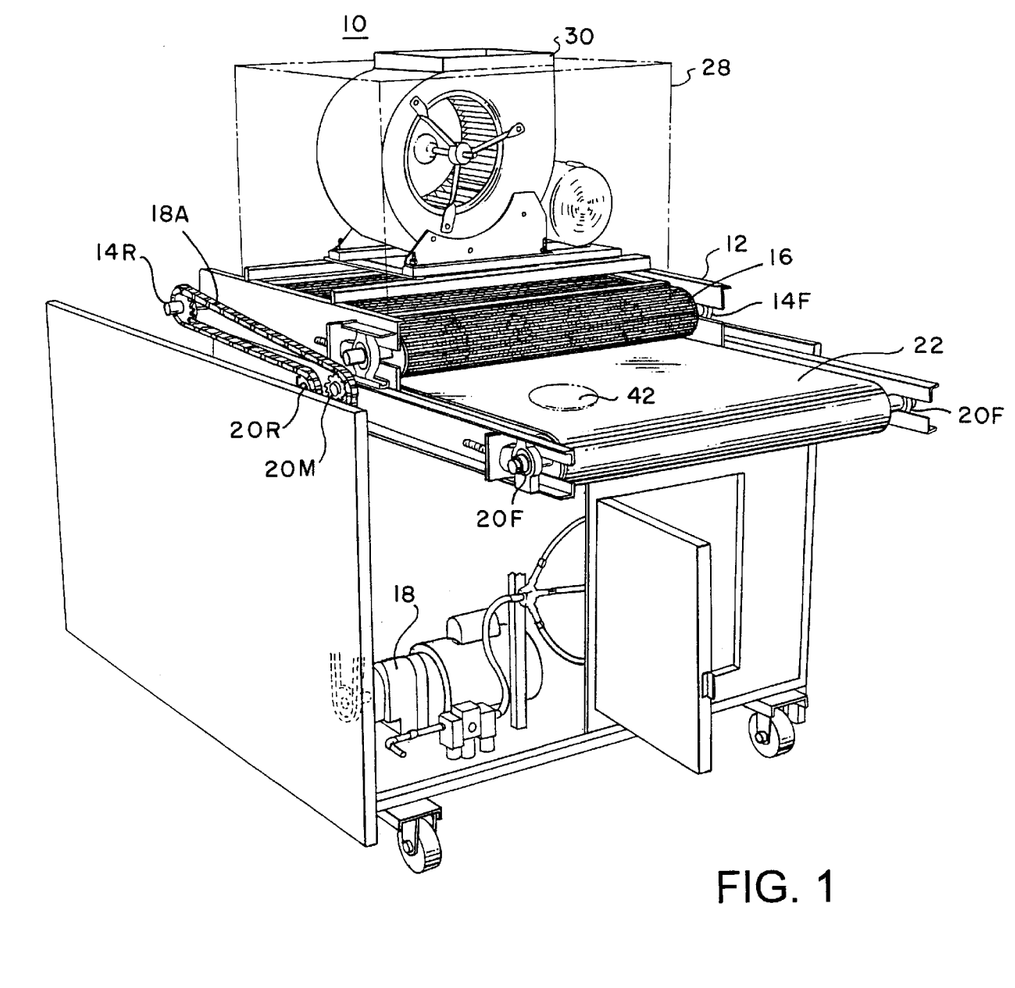
FIG. 1 is a left front top partial cut away perspective view of a counter-stacker for tortillas with vacuum module (10).

Referring to FIG. 1, a counter-stacker for tortillas with vacuum module (10) includes a housing (12). The operation of the counter-stacker (10) described herein is similar in many respects to the counter-stacker described in our prior U.S. patent application Ser. No. 09/072,563 filed on May 5, 1998, titled Tortilla Counter-Stacker, particularly in regards to the formation of stacks using a lift cylinder, stacker cylinder, and vibrating conical canister. The disclosure of said prior application is incorporated herein by reference.

It has been found, however, that larger, more flexible tortillas are more difficult to reliably move onto the stack without folding, since no trajectory guide of any kind is utilized in our prior device. Therefore we have developed a vacuum module that can be used to move tortillas directly over a conical canister and reliably drop relatively large and flexible tortillas into the canister and onto a stack, while maintaining uniform support of the tortilla until the moment it is positioned substantially over the canister and stack. While the vacuum module is described and illustrated herein as being permanently fixed to the counter-stacker, one skilled in the art will recognize that the module can be adapted for quick changeouts in the event the same counter-stacker is also used for smaller tortillas that do not required the special capabilities of the vacuum module.

Figure 2:
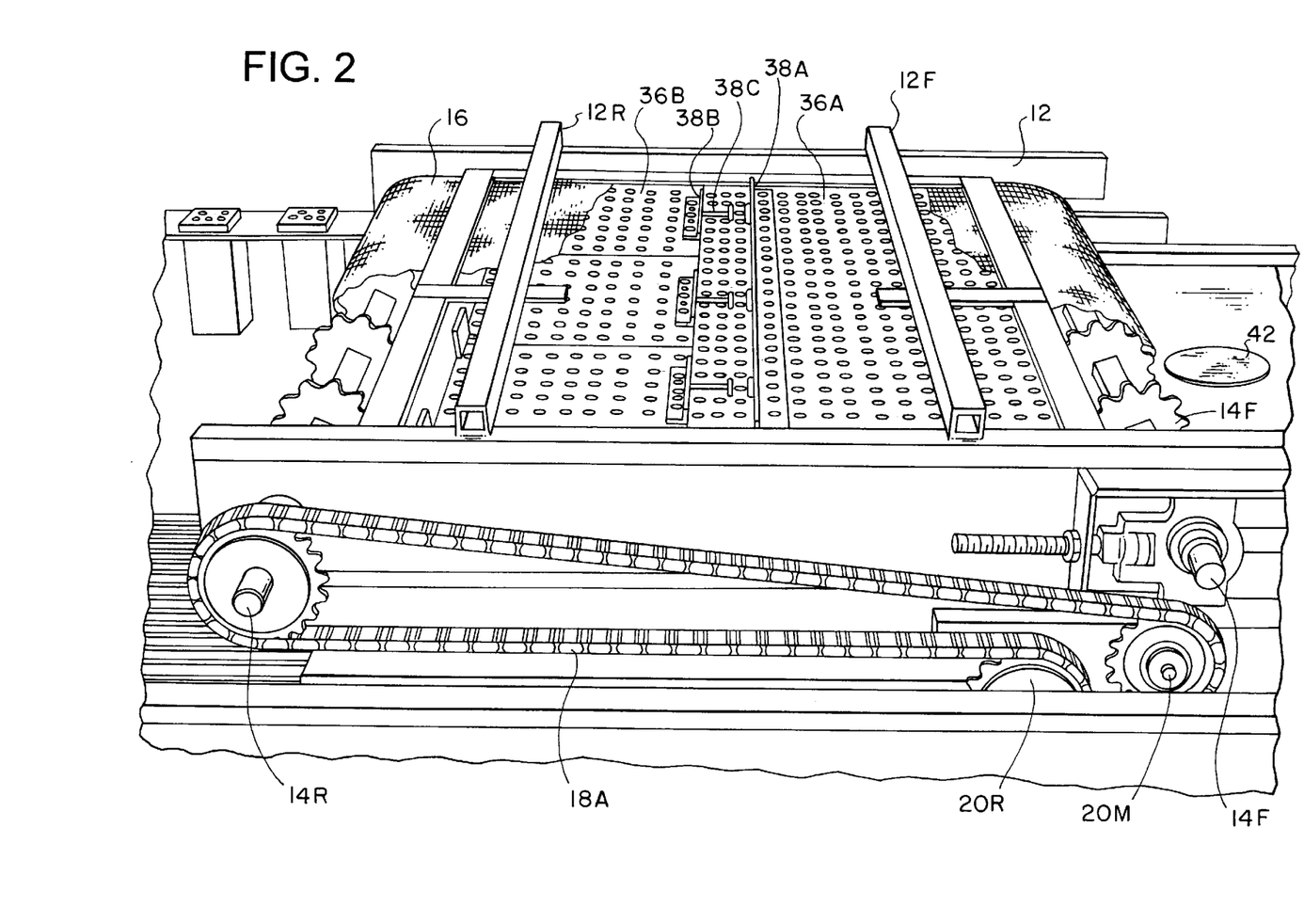
FIG. 2 is a left top partial cut away perspective view of the vacuum module exhibiting a front perforated belt tractor (14F), rear perforated belt tractor (14R) and perforated belt (16).

Referring to FIGS. 1 and 2, counter-stacker with vacuum module (10) includes a front perforated belt tractor (14F), rear perforated belt tractor (14R) and perforated belt (16). The housing (12) may optionally comprise at least one support which securely mounts the vacuum blower (30). The at least one support preferably comprises a housing front support (12F) and a housing rear support (12R). The front perforated belt tractor (14F) and a rear perforated belt tractor (14R) are rotatably mounted at a top front and top rear position within the housing (12), respectively. The perforated belt (16) is positioned around the front perforated belt tractor (14F) and the rear perforated belt tractor (14R). At least one incoming tortilla (42) is positioned thereon.

The counter-stacker (10) further comprises a front feeder belt tractor (20F) and a rear feeder belt tractor (20R) rotatably mounted at a middle front and middle rear position within the housing (12), respectively. A feeder belt (22) is positioned around the front feeder belt tractor (20F) and the rear feeder belt tractor (20R).

The counter-stacker (10) further comprises a front stacker belt tractor (24F) and a rear stacker belt tractor (24R) rotatably mounted at a bottom front and bottom rear position within the housing (12), respectively. A plurality of stacker belts (26) are positioned around the front stacker belt tractor (24F) and the rear stacker belt tractor (24R).

The counter-stacker (10) further comprises a drive motor (18) connected to the perforated belt tractor and the feeder belt tractor and the stacker belt tractor by at least one drive motor connector (18A). The drive motor connector (18A) is connected to the rear perforated belt tractor (14R), a middle feeder belt tractor (20M), a drive motor pulley (18B), a middle stacker belt tractor (24M), the front stacker belt tractor (24F), and the rear feeder belt tractor (20R).

The counter-stacker (10) further comprises a vacuum housing (28) sealably mounted to a top surface of the housing (12). A vacuum blower (30) is securely mounted within the vacuum housing (28). The vacuum blower (30) has an upward ingress, such that air is pulled into the housing (12) at the bottom and expelled at the top. Vacuum blower (30) may be a conventional squirrel cage unit as shown, but many equivalents will be known to those skilled in the art.

The counter-stacker (10) further comprises at least one stacker canister (32) positioned under a rear end of the perforated belt (16). The stacker canister (32) preferably comprises a upwardly-expanding stacker canister top (32T) and a cylindrical stacker canister bottom (32B).

Figure 3:
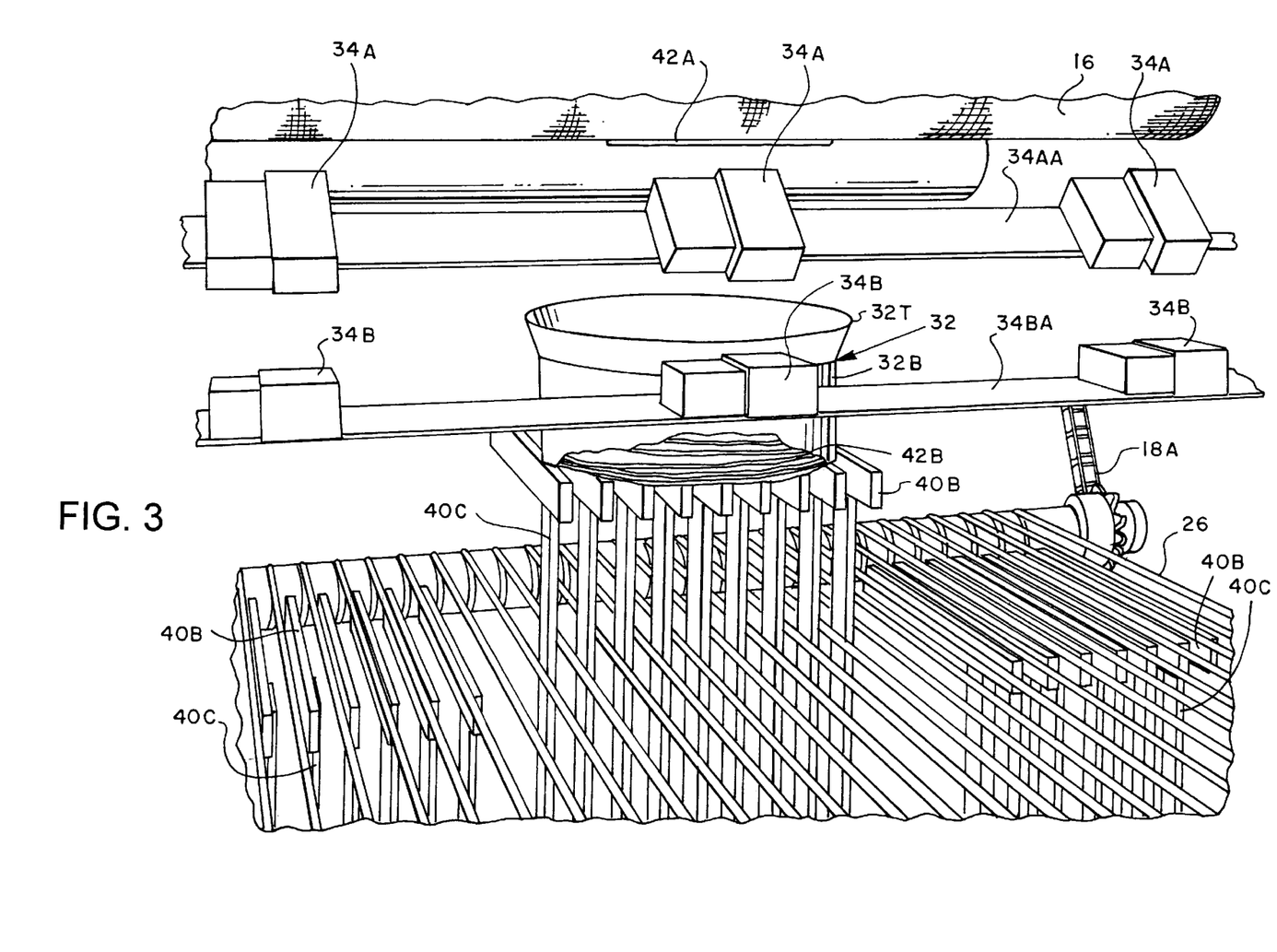
FIG. 3 is a rear view of a counter-stacker for tortillas with vacuum module (10) exhibiting an upper optical sensor (34A) and a lower optical sensor (34B) as well as a tortilla pre-stack (42B) being lowered onto a stacker belt (26) by an elevator (40).

Referring to FIG. 3, which is a rear view of a counter-stacker (10), a tortilla pre-stack (42B) is formed in stacker canister (32) prior to being lowered onto a stacker belt (26) by an elevator (40). At least one upper optical sensor (34A) mounted on an upper optical sensor mount (34AA) is positioned to sight any vacuum-lifted tortillas (42A) on the bottom surface of the perforated belt (16).

The counter-stacker (10) further comprises at least one lower optical sensor (34B) mounted on a lower optical sensor mount (34BA) positioned adjacent to the at least one stacker canister (32). The at least one lower optical sensor (34B) functions to determine how many tortillas are in a tortilla pre-stack (42B).

Figure 4A:
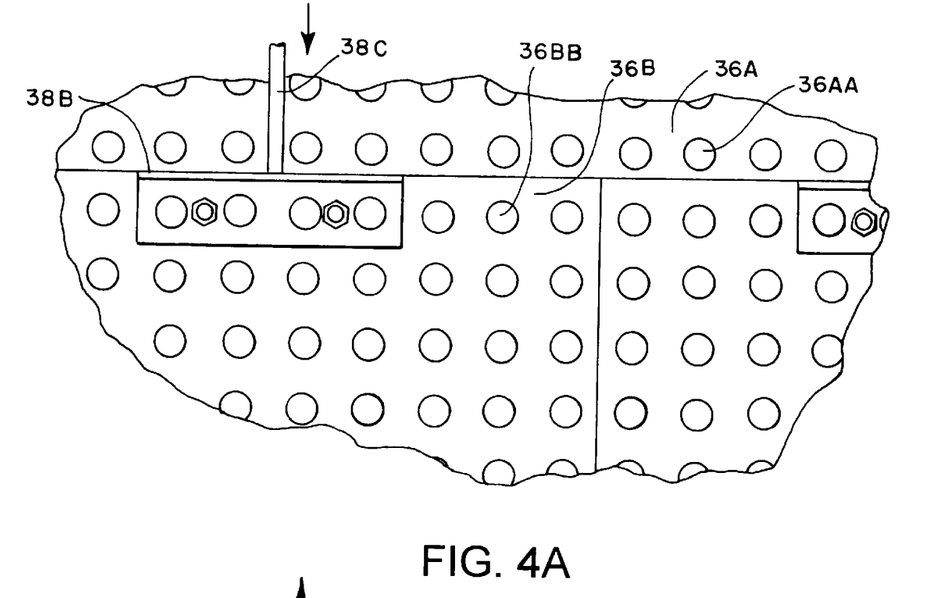
FIG. 4A is a top view of a top perforated plate (36B) slidably positioned on top of a bottom perforated plate (36A) having top perforated plate openings (36BB) and bottom perforated plate openings (36AA) in alignment, thereby permitting vacuum ingress.
Figure 4B:
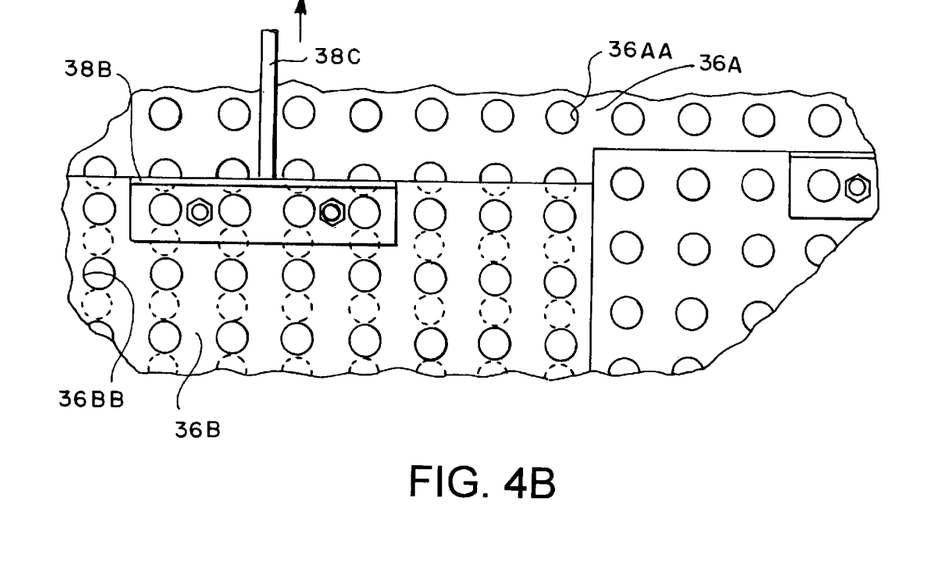
FIG. 4B is a top view of a top perforated plate (36B) slidably positioned on top of a bottom perforated plate (36A) having top perforated plate openings (36BA) and bottom perforated plate openings (36AA) misaligned, thereby causing no vacuum ingress.
Figure 5:
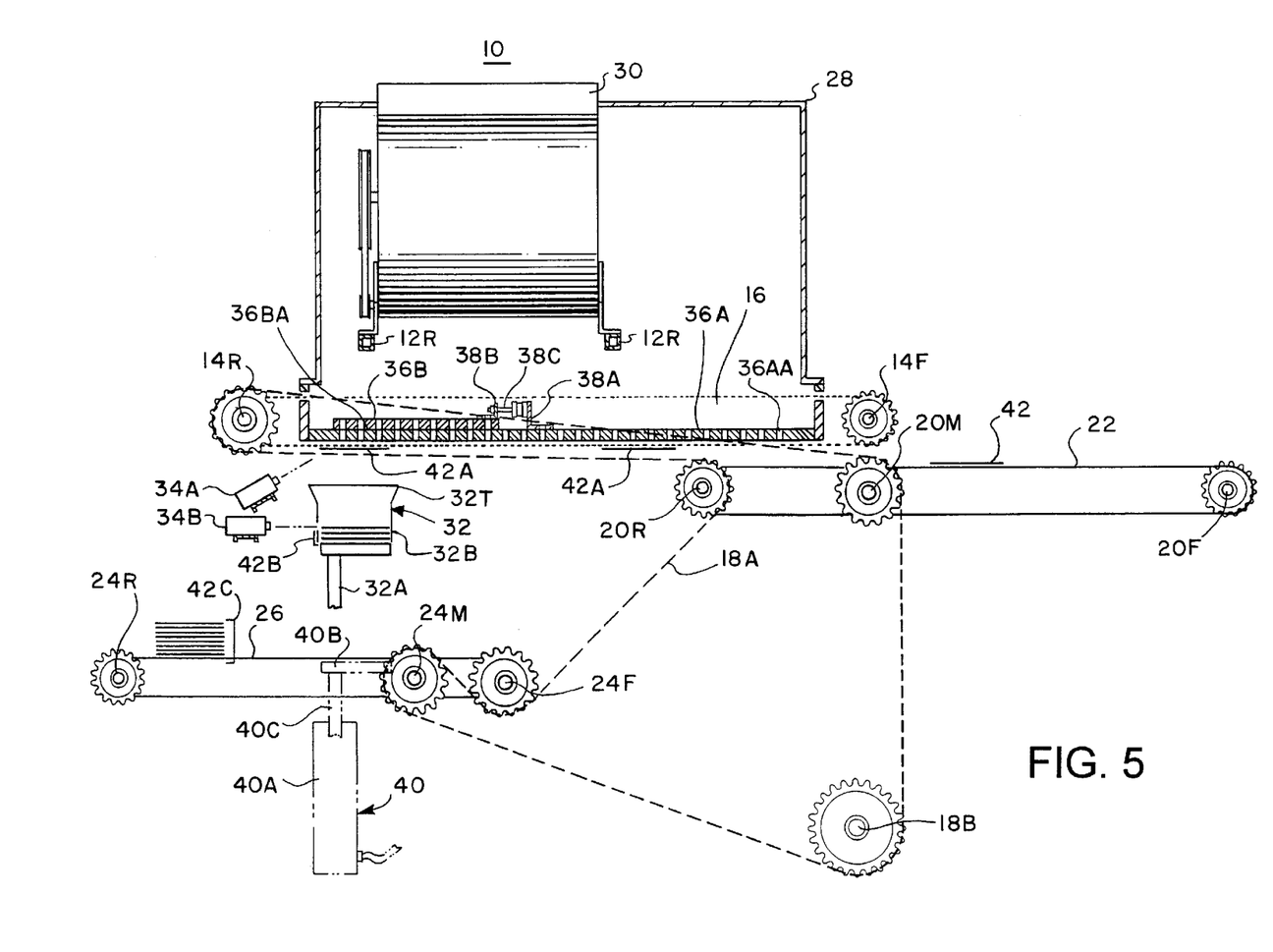
FIG. 5 is a side cross sectional view of the counter-stacker for tortillas with vacuum module (10).

Referring to FIG. 4A and FIG. 4B, top perforated plate (36B) is slidably positioned on top of a bottom perforated plate (36A) having a plurality of top perforated plate openings (36BB) and a plurality of complimentary positioned bottom perforated plate openings (36AA). Top perforated plate openings (36BB) and bottom perforated plate openings (36AA) are in alignment when positioned as shown in FIG. 4A, and misaligned when positioned as shown in FIG. 4B, permitting vacuum ingress and no vacuum ingress, respectively. Bottom perforated plate (36A) is positioned within the perforated belt (16) between the front perforated belt tractor (14F) and the rear perforated belt tractor (14R).

The counter-stacker (10) further comprises at least one bottom connector (38A) connected to the bottom perforated plate (36A). At least one top connector (38B) is connected to the top perforated plate (36B). At least one actuator (38C) is connected between the at least one bottom connector (38A) and the at least one top connector (38B). When the at least one upper optical sensor (34A) detects a vacuum-lifted tortilla (42A), a signal is transmitted to the at least one actuator (38C) which shifts position of the bottom perforated plate (36A) and the top perforated plate (36B), and concurrently the plurality of bottom perforated plate openings (36AA) and plurality of top perforated plate openings (36BA) become misaligned, causing no vacuum ingress in the vacuum housing (28), allowing the vacuum-lifted tortilla (42A) to fall into the at least one stacker canister (32).

The counter-stacker (10) may optionally further comprise an elevator (40) which comprises an elevator drive (40A) connected to a bottom end of a plurality of elevator vertical members (40C) each positioned between the plurality of stacker belts (26). Each of the plurality of elevator vertical members (40C) are securely attached at a top distal end to an elevator horizontal member (40B) which functions to lower the tortilla pre-stack (42B), in response to lower optical sensor (34B), onto the plurality of stacker belts (26), thereby forming a tortilla stack (42C). The tortilla stack (42C) moving on stacker belts (26) is then ready for bagging.

While omitted herein to enhance clarity and understanding, it will be appreciated that elevator (40) will operate best with a sequenced retractable plate to hold the tortilla pre-stack (42) while the elevator (40) transitions between its upper and lower positions, as described in our prior patent application referenced above.

Whereas, the present invention has been described with respect to a specific embodiment thereof, it will be understood that various changes and modifications will be suggested to one skilled in the art, and it is intended to encompass such changes and modifications as fall within the scope of the appended claims.

It will be understood that each of the elements described above, or two or more together, may also find a useful application in other types of constructions differing from the type described above.

While the invention has been illustrated and described as embodied in a Tortilla Counter-Stacker, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A counter-stacker (10) for tortillas comprising:

A) a housing (12);

B) a perforated belt (16) within the housing (12), the perforated belt (16) adapted and arranged to receive incoming tortillas (42) and form vacuum-lifted tortillas (42A);

C) at least one stacker belt (26) rotatably mounted within the housing (12);

D) a vacuum housing (28) sealably mounted to the housing (12), the vacuum housing (28) connected to a means for producing vacuum (30) to the perforated belt (16);

E) at least one stacker canister (32) positioned under a rear end of the perforated belt (16) and above the at ;east stacker belt (26);

F) a bottom perforated plate (36A) having a plurality of bottom perforated plate openings (36AA) therethrough positioned within the perforated belt (16);

G) a top perforated plate (36B) slidably positioned on top of the bottom perforated plate (36A), the top perforated plate (36B) comprising a plurality of top perforated plate openings (36BA) adapted to be complimentary positioned with the bottom plate openings (36AA); and H) at least one actuator (38C) connected to the top perforated plate (36B), such that when the at least one actuator (38C) shifts position of the top perforated plate (36B) thereby causing the plurality of bottom perforated plate openings (36AA) and the plurality of top perforated plate openings (36BA) to be concurrently misaligned causing no vacuum ingress in the vacuum housing (28), allowing the vacuum-lifted tortillas (42A) to fall into the at least one stacker canister (32).

2. The counter-stacker (10) as described in claim 1 further comprising a front perforated belt tractor (14F) and a rear perforated belt tractor (14R) rotatably mounted at a top front and a top rear position within the housing (12), respectively, with the perforated belt (16) positioned around the front perforated belt tractor (14F) and the rear perforated belt tractor (14R).

3. The counter-stacker (10) as described in claim 1 further comprising a front feeder belt tractor (20F) and a rear feeder belt tractor (20R) rotatably mounted at a middle front and a middle rear position within the housing (12), respectively, and a feeder belt (22) positioned around the front feeder belt tractor (20F) and the rear feeder belt tractor (20R) the feeder belt (22) for feeding tortillas (42) to the perforated belt (16).

4. The counter-stacker (10) as described in claim 1 further comprising a front stacker belt tractor (24F) and a rear stacker belt tractor (24R) rotatably mounted at a bottom front and a bottom rear position within the housing (12), respectively, and a plurality of stacker belts (26) positioned around the front stacker belt tractor (24F) and the rear stacker belt tractor (24R) the stacker belts (26) for receiving tortilla stacks (42C) from the at least one canister (32).

5. The counter-stacker (10) as described in claim 1 further comprising:
   a front perforated belt tractor (14F) and a rear perforated belt tractor (14R) rotatably mounted at a top front and a top rear position within the housing (12), respectively, with the perforated belt (16) positioned around the front perforated belt tractor (14F) and the rear perforated belt tractor (14R);
   a front feeder belt tractor (20F) and a rear feeder belt tractor (20R) rotatably mounted at a middle front and a middle rear position within the housing (12), respectively, and a feeder belt (22) for feeding tortillas (42) to the perforated belt (16), and positioned around the front feeder belt tractor (20F) and the rear feeder belt tractor (20R); and
   a front stacker belt tractor (24F) and a rear stacker belt tractor (24R) rotatably mounted at a bottom front and a bottom rear position within the housing (12), respectively, and a plurality of stacker belts (26) for receiving a tortilla stack (42C) from the at least one canister (32), and positioned around the front stacker belt tractor (24F) and the rear stacker belt tractor (24R).

6. The counter-stacker (10) as described in claim 5 further comprising a drive motor (18) connected to the perforated belt tractor and the feeder belt tractor and the stacker belt tractor by at least one drive motor connector (18A).

7. The counter-stacker (10) as described in claim 1 further comprising at least one upper optical sensor (34A) positioned to sight a bottom surface of the perforated belt (16), and the actuator (38C) connected to the upper optical sensor (34A), such that when the at least one upper optical sensor (34A) detects a vacuum-lifted tortilla (42A), a signal is transmitted to the at least one actuator (38C).

8. The counter-stacker (10) as described in claim 1 further comprising at least one lower optical sensor (34B) positioned adjacent to the at least one stacker canister (32), the at least one lower optical sensor (34B) functioning to determine how many tortillas are in a tortilla pre-stack (42B).

9. A counter-stacker (10) for tortillas comprising:
   A) a housing (12);
   B) a front perforated belt tractor (14F) and a rear perforated belt tractor (14R) rotatably mounted at a top front and a top rear position within the housing (12), respectively;
   C) a perforated belt (16) positioned around the front perforated belt tractor (14F) and the rear perforated belt tractor (14R), the perforated belt (16) adapted and arranged to receive incoming tortillas (42) and form vacuum-lifted tortillas (42A);
   D) a front feeder belt tractor (20F) and a rear feeder belt tractor (20R) rotatably mounted at a middle front and a middle rear position within the housing (12), respectively;
   E) a feeder belt (22) positioned around the front feeder belt tractor (20F) and the rear feeder belt tractor (20R) the feeder belt (22) for feeding tortillas (42) to the perforated belt (16);
   F) a front stacker belt tractor (24F) and a rear stacker belt tractor (24R) rotatably mounted at a bottom front and a bottom rear position within the housing (12), respectively;
   G) a plurality of stacker belts (26) positioned around the front stacker belt tractor (24F) and the rear stacker belt tractor (24R);
   H) a drive motor (18) connected to the rear perforated belt tractor (14R) and the rear feeder belt tractor (20R) and the front stacker belt tractor (24F) by at least one drive motor connector (18A);
   I) a vacuum housing (28) for providing vacuum to the perforated belt (16), sealably mounted to a top surface of the housing (12);
   J) a vacuum blower (30) securely mounted within the vacuum housing (28), the vacuum blower (30) having a downward ingress;
   K) at least one stacker canister (32) positioned under a rear end of the perforated belt (16), the at least one stacker canister (32) for feeding a tortilla stack (42C) to stacker belts (26);
   L) at least one upper optical sensor (34A) mounted on an upper optical sensor mount (34AA) positioned to sight a bottom surface of the perforated belt (16);
   M) at least one lower optical sensor (34B) mounted on a lower optical sensor mount (34BA) positioned adjacent to the at least one stacker canister (32), the at least one lower optical sensor (34B) functioning to determine how many tortillas are in a tortilla pre-stack (42B);
   N) a bottom perforated plate (36A) having a plurality of bottom perforated plate openings (36AA) therethrough positioned within the perforated belt (16) between the front perforated belt tractor (14F) and the rear perforated belt tractor (14R);
   O) a top perforated plate (36B) slidably positioned on top of the bottom perforated plate (36A), the top perforated plate (36B) comprising a plurality of top perforated plate openings (36BA) adapted to be complimentary positioned with the bottom plate openings (36AA); and
   P) at least one bottom connector (38A) connected to the bottom perforated plate (36A), at least one top connector (38B) connected to the top perforated plate (36B), and at least one actuator (38C) connected to the at least one bottom connector (38A) and the at least one top connector (38B), whereby when the at least one upper optical sensor (34A) detects a vacuum-lifted tortilla (42A), a signal is transmitted to the at least one actuator (38C) which shifts position of the bottom perforated plate (36A) and the top perforated plate (36B) and concurrently the plurality of bottom perforated plate openings (36AA) and the plurality of top perforated plate openings (36BA) are misaligned causing no vacuum ingress in the vacuum housing (28), allowing the vacuum-lifted tortilla (42A) to fall into the at least one stacker canister (32).

10. The counter-stacker (10) as described in claim 9, wherein the housing (12) comprises at least one support which securely mounts the vacuum blower (30).

11. The counter-stacker (10) as described in claim 10, wherein the at least one support comprises a housing front support (12F) and a housing rear support (12R).

12. The counter-stacker (10) as described in claim 9, wherein the at least one drive motor connector (18A) is connected to the rear perforated belt tractor (14R), a middle feeder belt tractor (20M), a drive motor pulley (18B), a middle stacker belt tractor (24M), the front stacker belt tractor (24F), and the rear feeder belt tractor (20R).

13. The counter-stacker (10) as described in claim 9, wherein the stacker canister (32) comprises an upwardly-expanding stacker canister top (32T).

14. The counter-stacker (10) as described in claim 9 further comprising an elevator (40) which comprises an elevator drive (40A) connected to a bottom end of a plurality of elevator vertical members (40C) each positioned between the plurality of stacker belts (26), each of the plurality of elevator vertical members (40C) securely attached at a top distal end to an elevator horizontal member (40B) which functions to lower the tortilla pre-stack (42B) onto the plurality of stacker belts (26) forming a tortilla stack (42C).

* * * * *